Nov. 4, 1941.　　　　C. R. ROCHE　　　　2,261,128

TRANSMISSION

Filed May 13, 1932

INVENTOR:
CLIFTON R. ROCHE,
By

ATTORNEY.

Patented Nov. 4, 1941

2,261,128

UNITED STATES PATENT OFFICE 2,261,128

TRANSMISSION

Clifton R. Roche, Los Angeles, Calif.

Application May 13, 1932, Serial No. 611,043

20 Claims. (Cl. 74—336.5)

My invention relates to means for transmitting rotation from one part to another, and relates particularly to a transmission having especial utility in automotive devices.

For an easy understanding of my invention and its principles, the application of the invention to automotive vehicles may be considered. In automotive vehicles it is customary to employ between the engine and wheels thereof a transmission consisting of gears adapted to be combined in different ratios so that by engaging different sets of gears the wheels of the vehicle may be operated at varied speeds relative to the speed of rotation of the engine, thereby making it possible to utilize the power of the engine to the best advantage. In this customary form of transmission a clutch is employed which must be released when it is desired to change the driving ratio of the engine to the wheels of the vehicle. Also, in this common form of transmission it is necessary to disengage one set of gears when another set of gears is to be employed for driving purposes. My invention comprehends an improvement in gear transmissions of the character above discussed, wherein several driving ratios may be attained without the necessity of disengaging gears or of disengaging the standard clutch by which the transmission is connected to the engine of the vehicle.

In a transmission of the above character a number of gears, which may be called drive gears, are connected to the engine so as to be rotated thereby, and there are also a number of driven gears which are adapted to be connected to the respective drive gears in order to attain the desired speed ratio in the driving of the vehicle wheels by the engine. My invention may be employed in conjunction with any drive gear and its cooperating driven gear or in conjunction with a plurality of such gear sets; accordingly, in order to disclose my invention in the simplest possible manner I am confining this application to a simple form of the invention which is representative of its general principles and is indicative of the manner in which it may be duplicated in building up more complex transmission mechanisms.

It is an object of my invention to provide a transmission having a drive member and a driven member adapted to be connected through a one-way clutch in a manner to drive the driven member at a speed proportionate to the speed of the drive member, and an auxiliary driving means adapted to be connected between the drive member and the driven member so as to drive the driven member at a speed greater than the speed at which it is driven by the drive member through the one-way clutch. When the secondary or auxiliary driving means is effective, the driven member is rotated at a higher speed than the drive member, which condition is permitted by the one-way clutch which is so situated in the device that it may also act as a free wheeling device for the vehicle with which the transmission is used.

It is a further object of the invention to provide a device of the character set forth in the preceding paragraph having means for automatically effectuating the driving of the driven member through the auxiliary or secondary driving means when a predetermined speed of rotation in selected parts of the mechanism is reached. In the preferred form of the invention the device is so constructed that the secondary driving means will come into operation when a predetermined speed of travel of the vehicle is reached.

Further objects and advantages of the invention will be made evident throughout the following part of the specification.

Referring to the drawing, which is for illustrative purposes only,

Figure 1:
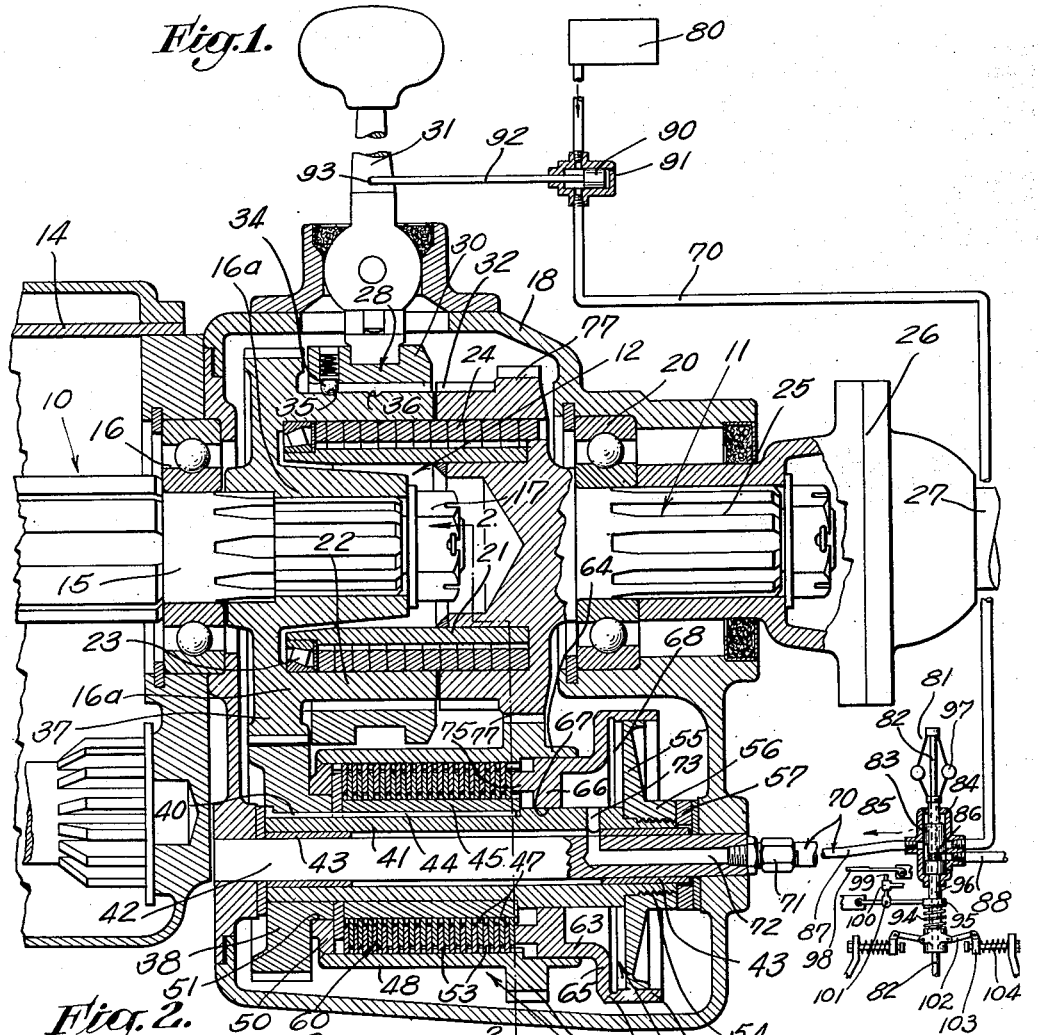
Fig. 1 is a vertically longitudinally sectioned view through a preferred embodiment of my invention.
Figure 2:
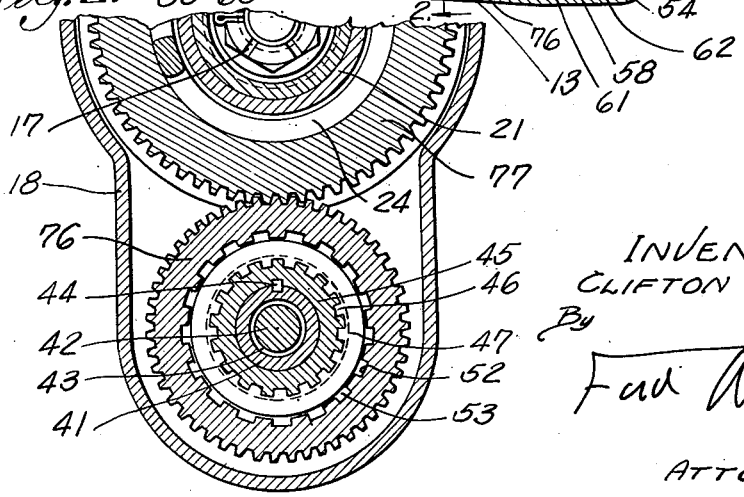
Fig. 2 is a fragmentary cross section on a plane represented by the line 2—2 of Fig. 1.

As shown in the drawing, my invention includes a drive member 10, a driven member 11, primary driving means 12 for driving the driven member 11 from the drive member 10 at a speed proportionate to the speed of the drive member, and secondary driving means 13 for driving the driven member from the drive member at a speed higher than the proportionate speed at which it would be driven from said drive member 10 through the primary driving means 12. In this simple form of the invention the drive member 10 consists of a power shaft extending from a transmission gear case 14, the details of which are not shown for the reason that it may be of any accepted design. Accordingly, the drive member 10 is adapted to be driven from any power source through any desired gears or directly, as may be desired. The drive member 10 has a splined end 15 which projects through a bearing 16 carried in the case 14, and includes a cup-shaped member 16a which is held in place on the splined end 15 by a nut 17.

In the outer or rightward end of a casing 18 which encloses the member 16a is a bearing 20 which supports the driven member 11 in alignment with the drive member 10. This driven member 11 has a sleeve 21 which extends into the cylindrical wall 22 of the cup-shaped member 16a forming part of the drive member 10, and at the leftward end of the sleeve 21 a roller bearing 23 is placed in a position to centralize such leftward end of the sleeve 21 within the cup-shaped member 16a.

The primary driving means 12 is in the form of a clutch adapted to drivably connect the drive member 10 with the driven member 11 and in its simplest form is given one-way drive characteristics such as employed in one-way or over-running clutches of free wheeling units. Accordingly, such primary driving means includes a steel spring 24 which surrounds the sleeve 21 and is secured to the driven member 11. This spring 24 extends into the cylindrical wall 22 of the cup-shaped member 16a and expands against the inner face of the wall 22 so as to produce a frictional driving engagement when it is attempted to rotate the cup-shaped member 16a in forward direction at a speed of rotation greater than that of the driven member 11. The splined rightward end 25 of the driven member 11 is connected through a universal coupling 26 with a drive shaft 27 which, in accordance with standard automotive practice, is extended rearwardly to drive the axles on which the rear wheels of the vehicle are mounted. Should the driven member 11 be rotated forwardly at a speed greater than the speed of the drive member 10, the clutch element consisting of the spring 24 will slide within the cylindrical wall 22. The primary driving means 12 also includes a positive or direct clutch 28 for connecting the drive member 10 and the driven member 11, this clutch including an annular member 30 splined on the cylindrical wall 22 and being adapted to be moved rightwardly by means of a lever 31 into engagement with teeth 32 on the driven member 11. A detent means for the member 30 is shown in the form of a spring-pressed ball 34 adapted to engage notches 35 and 36 in the wall 22.

The drive member 10 includes a gear 37 which is preferably formed on the cup-shaped member 16a in the manner shown, this gear 37 being adapted to engage a smaller gear 38 which is keyed, as indicated at 40, to the leftward end of a rotatable sleeve 41 mounted on a stationary shaft 42 held in the lower part of the casing 18, there being sleeve bearings 43 between the sleeve 41 and the shaft 42. Surrounding the sleeve 41 and keyed thereto by a key member 44 is a sleeve 45 having a series of splines 46 formed longitudinally on the exterior thereof, and engaging the splines 46 are a plurality of friction plates 47 which surround the sleeve 45. Surrounding the assembly of friction plates 47 is a cylindrical member 48 having an inwardly turned lip or flange 50 which makes bearing engagement with a cylindrical face 51 provided by the gear 38, such bearing engagement serving to centralize the leftward end of the cylindrical member 48 relative to the axis of rotation of the sleeve 45. The cylindrical member 48 has interior splines 52 which are engaged by friction plates 53 extending between the friction plates 47. The rightward end of the sleeve 41 is turned down and threaded as shown at 54 so that a circular plate or wall 55 may be secured thereon by means of a nut 56, and adjacent the rightward end of the sleeve 41 thrust bearing washers 57 are placed. The circular wall 55 forms a part of a fluid-expanded means 58 having the function of actuating a clutch element 60 formed principally by the friction plates 47 and 53 and the parts which these friction plates interconnect. The fluid-expanded means or actuated means 58 for the clutch element 60 includes a cup-shaped member 61 having a cylindrical wall 62 which surrounds the wall 55 and is adapted to slide axially thereon, and an inner cylindrical wall 63 which extends into the rightward end 64 of the cylindrical member 48. The cylindrical wall 63 is connected to the cylindrical wall 62 by a radial wall 65, and a radial wall 66 extends inwardly from the leftward end of the cylindrical wall 63 into sliding engagement with a cylindrical face 67 formed on or near the rightward end of the sleeve 41. Fluid under pressure may be delivered into the chamber or space 68 within the fluid-expanded means 58 by means of a conduit 70 which is connected by a fitting 71 to a passage 72 in the rightward end of the shaft 42, the leftward end of the passage 72 turning upwardly so as to communicate with a radial opening 73 leading into the chamber 68 of the member 58. By delivering a fluid, such as oil, under pressure through the conduit 70 to the space 68, the member 61 may be forced leftwardly so that an annular rib 75 at the leftward end thereof will bear against the assembly of friction plates 47 and 53, forcing them tightly together so that the frictional engagement thereof will cause the cylindrical member 48 to rotate with the sleeve 41. The cylindrical member 48 carries a gear 76 which is larger than the gear 38 and engages a gear 77 formed on the driven member 11.

The driven member 11 may be driven from the drive member 10 through the one-way clutch or spring 24 or the direct drive clutch 28 of the primary driving means 12. When the direct drive clutch 28 is disengaged, as shown in Fig. 1, the driven member 11 may be rotated faster than the drive member 10, the member 24 at this time sliding within the cylindrical wall 22. During such transmission of power from the drive member 10 to the driven member 11 through the primary driving means 12, the gear 37 engaging the gear 38 will rotate the sleeve 41 at a speed proportionate to the ratio of the gears 37 and 38, and the gear 77 engaging the gear 76 will rotate the cylindrical member 48 at a speed proportionate to the ratio of the gears 77 and 76. At this time the sleeve 41 will rotate at a higher rate than the cylindrical member 48 for the reason that the ratio of the gears 37 and 38 is greater than the ratio of the gears 77 and 76. Should the clutch element 60 of the secondary driving means 13 be actuated to frictionally lock the gears 38 and 76 together so that the gear 76 will rotate at the same rate of speed as the gear 38, the gear 77 will be rotated forwardly at a speed of rotation greater than the speed of the drive member 10 owing to the manner in which the gears are proportioned. Therefore, during the actuation of the clutch element 60, the drive of the driven member 11 will be taken from the one-way clutch means 24 of the primary driving means 12 by the secondary driving means, and the driven member 11 will be rotated at a higher rate of speed than the drive member 10, the member 24 sliding forwardly in the cylindrical wall 22 at this time.

Fluid under pressure, such as oil from a pressure reservoir such as indicated diagrammatically at 80, may be delivered through the conduit 70 to the passage 72 leading to the fluid-expanded means 58, and such delivery of oil may be controlled by any suitable valve mechanism. It is a feature of the invention to provide a valve which is automatically controlled and operated in accordance with the speed of a moving part of the vehicle. Accordingly, I have shown in a diagrammatic manner a centrifugal type governor device 81 mounted on a shaft 82 which may be connected to a desired rotating part of the vehicle. In the preferred practice of the invention the shaft 82 is connected to the speedometer shaft and accordingly is drivably connected with the driven member 11. The governor device 81 is adapted to move a valve body 83 in a valve casing 84 so as to lift the valve body 83 and permit oil to flow through the conduit 70 in the direction of the arrow 85 to actuate the clutch element 60 when the speed of movement of the vehicle reaches a predetermined point, for instance, thirty-five miles per hour, thereby giving a reduction in the engine speed or an increase in the speed of travel of the vehicle for the same engine speed at this time, all of which is accomplished automatically without activity on the part of the operator of the automobile other than that of controlling the customary engine throttle. When the speed of the vehicle drops below the predetermined critical speed, the valve body 83 is lowered so that the fluid channel 86 thereof will connect the leftward portion 87 of the conduit 70 with a drain tube 88 so that the pressure in the fluid-expanded means 58 will be quickly released to release the plates 47 and 53 of the clutch element 60, discontinuing the higher ratio drive through the secondary driving means 13 and allowing the driving of the driven member 11 to be reassumed by the primary driving means 12.

The invention also includes means for preventing operation of the secondary driving means at the wrong time, as, for example, when the direct drive clutch 28 of the primary driving means 12 is engaged. For this purpose I have shown a valve body 90 in a valve casing 91 connected into the conduit 70. The valve body 90 is connected with the lever 31 through a rod or link 92 which may be connected to the lever 31 at 93. When the lever 31 is rotated in anti-clockwise direction to shift the member 30 into engagement with the teeth 32, the closure member 90 is moved leftwardly into a position preventing passage of oil under pressure through the conduit 70, thereby making impossible the delivery of fluid under pressure to the fluid-expanded means 58 when the direct drive clutch element 28 of the primary driving means 12 is engaged.

Previously herein I have set forth that the governor device 81 is adapted to actuate the clutch element 60 at a predetermined speed of the driven member 11. It is not to be assumed that this predetermined speed is definitely fixed but that it may be varied as conditions in the operation of the vehicle may require. Accordingly, in Fig. 1 I have diagrammatically shown in conjunction with the governor device 81 a spring 94 surrounding a sleeve 96 projecting from the valve body 83 to resist upward movement of the valve body 83 by the governor balls 97, the pressure of this spring 94 to resist upward movement of the valve body 83 by use of a lever or adjusting part 95 which may be forced downwardly relative to the upper end of the spring 94 through depression of a lever 98, which may be the accelerator lever or pedal of an automobile, through a link 99 which extends through a guide 100 and pivotally engages the lever 95 at 101. Accordingly, by depressing the lever 98, the spring 94 may be compressed, and the speed at which oil under pressure is introduced to the fluid-expanded member 58 may be varied. In conjunction with the valve body 83, I show means for producing a quick movement of the valve body from closed to open position, such means consisting of toggle bars 102 which are secured to blocks 103 adapted to be forced inwardly by springs 104. Since the operation of snap-action means of this character is well known, further description thereof is unnecessary.

It will be perceived that the means represented by the toggles 102 and the springs 104 for producing a snap action of the valve body 83 also resists the return movement of the valve body 83 until the downward pressure applied to the valve body by the spring 94 is below the pressure at which the balls 97 of the governor device 81 raise the valve body 83 into a position to permit a flow of fluid under pressure into the conduit 70 to actuate the clutch element 60. Accordingly, the springs 94 and 104 may be so proportioned that the clutch element 60 will be actuated when the speed of the driven member corresponds to a thirty-five mile per hour speed of travel of the vehicle, and the clutch element 60 will not be released until the speed of the driven member 11 drops to a value corresponding to a thirty-two mile per hour speed of travel of the vehicle. It will be further perceived that the invention provides in the member 99 a means for varying the value in the speed of rotation of said driven member 11 at which the governor device 81 will actuate said clutch element 60. For example, should the vehicle be propelled upwardly on a sloping roadway, the lever 98 which may be employed to control the feeding of fuel to the automobile engine will be depressed so that the engine will develop more power. This depression of the lever 98 will rotate the member 95 downwardly and compress the spring 94 so as to raise the value in the speed of rotation of said driven member 11 at which the governor device 81 will actuate.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. A transmission of the character described, including: a drive member; a driven member; primary driving means for connecting said drive member to said driven member so as to rotate said driven member at a speed proportionate to the speed of said drive member, said primary driving means including a one-way clutch; secondary driving means adapted to connect said drive and driven members so as to drive said driven member at a speed greater than the speed at which said driven member is driven through said primary driving means, said secondary driving means including a fluid-actuated clutch for connecting the parts thereof so as to drive said driven member from said drive member; and means for supplying fluid under pressure to said fluid-actuated clutch to operate the same.

2. A transmission of the chaarcter described, including: a drive member; a driven member; primary driving means for connecting said drive member to said driven member so as to rotate said driven member at a speed proportionate to the speed of said drive member, said primary driving means including a one-way clutch; secondary driving means adapted to connect said drive and driven members so as to drive said driven member at a speed greater than the speed at which said driven member is driven through said primary driving means, said secondary driving means including a fluid-actuated clutch for connecting the parts thereof so as to drive said driven member from said drive member; a source of fluid under pressure; a conduit connecting said source of fluid to said fluid-actuated clutch; valve means for controlling the flow of fluid through said conduit; a governor device for actuating said valve means; and drive means connecting said governor device with one of said members.

3. A transmission of the character described, including: a drive member; a driven member; primary driving means for connecting said drive member to said driven member so as to rotate said driven member at a speed proportionate to the speed of said drive member, said primary driving means including a one-way clutch; secondary driving means adapted to connect said drive and driven members so as to drive said driven member at a speed greater than the speed at which said driven member is driven through said primary driving means, said secondary driving means including a fluid-actuated clutch for connecting the parts thereof so as to drive said driven member from said drive member; a source of fluid under pressure; a conduit connecting said source of fluid to said fluid-actuated clutch; valve means for controlling the flow of fluid through said conduit; a governor device for actuating said valve means; and drive means connecting said governor device with said drive member.

4. A transmission of the character described, including: a drive member; a driven member; primary driving means for connecting said drive member to said driven member so as to rotate said driven member at a speed proportionate to the speed of said drive member, said primary driving means including a one-way clutch and a direct drive clutch; means for engaging said direct drive clutch; secondary driving means adapted to connect said drive and driven members so as to drive said driven member at a speed greater than the speed at which said driven member is driven through said primary driving means, said secondary driving means including a fluid-actuated clutch for connecting the parts thereof so as to drive said driven member from said drive member; a source of fluid under pressure; a conduit connecting said source of fluid to said fluid-actuated clutch; valve means for controlling the flow of fluid through said conduit; a governor device for actuating said valve means; drive means connecting said governor device with said drive member; and means for preventing actuation of said fluid-actuated clutch when said direct drive clutch of said primary driving means is engaged.

5. A transmission of the character described, including: a drive member; a driven member; primary driving means for connecting said drive member to said driven member so as to rotate said driven member at a speed proportionate to the speed of said drive member, said primary driving means including a one-way clutch and a direct drive clutch; means for engaging said direct drive clutch; secondary driving means adapted to connect said drive and driven members so as to drive said driven member at a speed greater than the speed at which said driven member is driven through said primary driving means, said secondary driving means including a clutch element; means for operating said clutch element of said secondary driving means; and means for preventing actuation of said clutch element when said direct drive clutch is engaged.

6. A transmission of the character described, including: a drive member; a driven member; primary driving means for connecting said drive member to said driven member so as to rotate said driven member at a speed proportionate to the speed of said drive member, said primary driving means including a one-way clutch; secondary driving means adapted to connect said drive and driven members so as to drive said driven member at a speed greater than the speed at which said driven member is driven through said primary driving means, said secondary driving means including a fluid-actuated clutch for connecting the parts thereof so as to drive said driven member from said drive member; a source of fluid under pressure; a conduit connecting said source of fluid to said fluid-actuated clutch; valve means for controlling the flow of fluid through said conduit; a governor device for actuating said valve means; and drive means connecting said governor device with said driven member.

7. A transmission of the character described, including: a drive member; a driven member; primary driving means for connecting said drive member to said driven member so as to rotate said driven member at a speed proportionate to the speed of said drive member, said primary driving means including a one-way clutch and a direct drive clutch; means for engaging said direct drive clutch; secondary driving means adapted to connect said drive and driven members so as to drive said driven member at a speed greater than the speed at which said driven member is driven through said primary driving means, said secondary driving means including a fluid-actuated clutch for connecting the parts thereof so as to drive said driven member from said drive member; a source of fluid under pressure; a conduit connecting said source of fluid to said fluid-actuated clutch; valve means for controlling the flow of fluid through said conduit; a governor device for actuating said valve means; drive means connecting said governor device with one of said members; and means for preventing actuation of said fluid-actuated clutch when said direct drive clutch of said primary driving means is engaged.

8. A transmission of the character described, including: a drive member; a driven member; primary driving means for connecting said drive member to said driven member so as to rotate said driven member at a speed proportionate to the speed of said drive member, said primary driving means including a one-way clutch; secondary driving means adapted to connect said drive and driven members so as to drive said driven member at a speed greater than the speed at which said driven member is driven through said primary driving means, said secondary driving means including a first part drivably connected to said drive member, a second part drivably connected to said driven member, and a clutch adapted to connect said first and second parts; and governor means connected to said driven member for automatically engaging said clutch in response to the speed of rotation of said driven member reaching a given value, said governor means having means controllable during the operation of the transmission for varying said value of the rotation of said driven member at which said clutch will be engaged.

9. In a transmission, the combination of: a drive member; a driven member; primary driving means for connecting said drive member to said driven member so as to rotate said driven member at a speed proportionate to the speed of said drive member, said primary driving means including a one way clutch; secondary driving means adapted to connect said drive and driven members so as to drive said driven member at a speed greater than the speed at which said driven member is driven through said primary driving means, said secondary driving means including an engageable and disengageable clutch element; a governing device controlled by one of said members; and a hydraulic controlling means connecting the governing device with said engageable and disengageable clutch element so as to cause the engagement of said clutch element at a predetermined speed of such member.

10. In a transmission, the combination of: a drive member; a driven member; primary driving means for connecting said drive member to said driven member so as to rotate said driven member at a speed proportionate to the speed of said drive member, said primary driving means including a one way clutch; secondary driving means adapted to connect said drive and driven members so as to drive said driven member at a speed greater than the speed at which said driven member is driven through said primary driving means, said secondary driving means including an engageable and disengageable clutch element; a governing device; and a hydraulic controlling means connecting the governing device with said engageable and disengageable clutch element so as to cause the engagement of said clutch element in response to the operation of said governing device.

11. A transmission of the character described, including: a drive member; a driven member; a fluid operated clutch for transmitting rotation from said drive member to said driven member; a source of controllable fluid pressure to engage said fluid operated clutch; and governor means connected to one of said members for automatically controlling said fluid pressure to cause said clutch to be automatically engaged in response to a speed value of such member, said governor means having centrifugal weight whose force is opposed by a spring force, and adjustment means for changing said spring force while said governor is in operation, thereby providing an adjustment for changing said speed value of such member at which said clutch will be automatically engaged.

12. In a transmission, the combination of: a drive member; a driven member; primary driving means for driving said driven member from said drive member at a speed proportionate to the speed of said drive member, said primary driving means including a one way clutch; secondary driving means adapted to connect said drive and driven members so as to drive said driven member at a speed greater than the speed at which said driven member is driven through said primary driving means, said secondary driving means including a fluid actuated engageable and disengageable clutch; means for supplying fluid under pressure to said clutch; and means for controlling said fluid to cause engagement and disengagement of said fluid actuated engageable and disengageable clutch whereby to control the drive of the driven member from the drive member through either the primary or secondary driving means.

13. In a transmission, the combination of: a drive member; a driven member; primary driving means for connecting said drive member to said driven member so as to rotate said driven member at a speed proportionate to the speed of said drive member, said primary driving means including a one way clutch; secondary driving means adapted to connect said drive and driven members so as to drive said driven member at a speed greater than the speed at which said driven member is driven through said primary driving means, said secondary driving means including a clutch element, engageable by pressure; means for exerting a potential pressure to engage said clutch element; and control means for releasing said potential pressure to engage said clutch element.

14. A transmission of the character described for use with an engine having an accelerator control, including: a drive member; a driven member; variable ratio driving means connecting said drive and driven members; hydraulic pressure actuated clutch means adapted to change the ratio of said variable ratio driving means; a centrifugal governor device, responsive to the speed of said driven member, movable independently of said hydraulically actuated clutch means and adapted automatically to control the application of pressure thereto to change the ratio of said driving means at a predetermined value in the speed of said driven member; force means opposing the action of said governor device; and means responsive to movement of said accelerator control for varying said force means to vary the value at which said governor device will automatically change said ratio of said driving means.

15. A transmission of the character described for use with an engine having an accelerator control, including: a drive member; a driven member; variable ratio driving means connecting said drive and driven members, including constant mesh gears and a shock absorbing hydraulic pressure actuated clutch means to take the shock in changing from one ratio to another and adapted to change the ratio of said variable ratio driving means; a centrifugal governor device responsive to the speed of said driven member adapted to control the application of pressure to said hydraulically actuated clutch means to change the ratio of said driving means at a predetermined value in the speed of said driven member; force means opposing the action of said governor device, and means responsive to movement of said accelerator control for varying said force means to vary the value at which said governor device will automatically change said ratio of said driving means.

16. A transmission of the character described for use with an engine having a depressible accelerator control member, including: a drive member; a driven member; variable ratio driving means connecting said drive and driven members; clutch means actuated by hydraulic pressure means adapted to change the ratio of said variable ratio driving means; a centrifugal governor device responsive to the speed of said driven member and movable independently of said clutch means and adapted to control said hydraulic pressure means to automatically change the ratio of said variable ratio driving means in response to speed values of said driven member; force means opposing the action of said governor device, and means responsive to the depression of said accelerator control member for assisting said force means for increasing said values at which the ratio of said driving means will automatically change in response to depression of the accelerator control member.

17. A transmission of the character described for use with an engine having an accelerator lever, including: a drive member; a driven member; a fluid-operated clutch for transmitting rotation from said drive member to said driven member; a source of controllable fluid pressure to engage said fluid-operated clutch; a centrifugal governor means connected to one of said members for automatically controlling said fluid pressure to cause said clutch to be automatically engaged in response to a speed value of such member, said centrifugal governor means having centrifugal weights whose force is opposed by a spring force, and adjustment means for changing said spring force; and means associated with the accelerator lever to act upon said adjustment means so as to increase the said spring force when the accelerator lever is depressed, so as to increase said speed value of such member at which said clutch will be automatically engaged.

18. A transmission of the character described for use with an engine having an accelerator control, including: a drive member; a driven member; variable ratio driving means connecting said drive and driven members; hydraulic pressure actuated clutch means adapted to change the ratio of said variable ratio driving means; a governor device, responsive to the speed of the driven member, movable independently of said hydraulically actuated means; means controlled by the governor device for controlling the application of pressure to said hydraulically actuated clutch means for changing the ratio of said driving means in response to a value in the speed of the driven member; force means opposing the action of said governor device on said controlling means; and means responsive to movement of said accelerator control acting to vary the value of said force means to cause the change in the value at which said controlling means will automatically change the ratio of said driving means.

19. A transmission of the character described for use with an engine having an accelerator control, including: a drive member; a driven member; variable ratio driving means connecting said drive and driven members; fluid pressure actuated clutch means adapted to change the ratio of said variable ratio driving means; valve means for controlling said fluid pressure; a centrifugal governor device, responsive to the speed of said driven member, movable independently of said fluid pressure actuated means and adapted automatically to control the valve means to change the ratio of said driving means at a predetermined value in the speed of said driven member; force means opposing the action of said governor device; and means responsive to movement of said accelerator control for varying said force means to vary the value at which said governor device will automatically change said ratio of said driving means.

20. In combination with an engine having a movable accelerator control member, a transmission comprising, in combination, a drive member, a driven member, change speed means including clutch means adapted to couple the drive and driven members together in a given drive relation, fluid pressure means for engaging said clutch means to establish said driving relationship including a fluid pressure line and a valve member in the line to control fluid pressure delivered by said line to said fluid pressure means, yielding means exerting a force upon said valve member in a valve closing direction, means responsive to the speed of movement of the driven member for causing a force to be exerted upon said valve opposite to that exerted by said yielding means and in a valve opening direction, and means responsive to various positions of said accelerator control member for positively applying a correspondingly variable third force upon said valve member in a valve closing direction.

CLIFTON R. ROCHE.